US006228287B1

(12) United States Patent
Wong

(10) Patent No.: US 6,228,287 B1
(45) Date of Patent: May 8, 2001

(54) TWO-STEP PROCESS FOR PREPARING POSITIVE TEMPERATURE COEFFICIENT POLYMER MATERIALS

(75) Inventor: Alex Wong, Sunshine City (HK)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 09/399,298

(22) Filed: Sep. 17, 1999

Related U.S. Application Data

(60) Provisional application No. 60/101,892, filed on Sep. 25, 1998.

(51) Int. Cl.[7] .............................. H01B 1/24; B29C 47/92
(52) U.S. Cl. .......................................... 252/511; 264/40.1
(58) Field of Search ..................... 252/510, 511; 264/40.1

(56) References Cited

U.S. PATENT DOCUMENTS

| 2,861,163 | 11/1958 | Asakawa | 201/72 |
|---|---|---|---|
| 2,978,665 | 4/1961 | Vernet et al. | 338/223 |
| 3,061,501 | 10/1962 | Dittman et al. | 156/250 |
| 3,138,686 | 6/1964 | Mitoff et al. | 200/142 |
| 3,187,164 | 6/1965 | Andrich | 219/504 |
| 3,243,753 | 3/1966 | Kohler | 338/31 |
| 3,351,882 | 11/1967 | Kohler et al. | 338/322 |
| 3,535,494 | 10/1970 | Armbruster | 219/528 |
| 3,571,777 | 3/1971 | Tully et al. | 338/20 |
| 3,619,560 | 11/1971 | Buiting et al. | 219/300 |
| 3,654,533 | 4/1972 | della Porta et al. | 317/258 |
| 3,673,121 | 6/1972 | Meyer | 252/511 |
| 3,689,736 | 9/1972 | Meyer | 219/222 |
| 3,745,507 | 7/1973 | Ishida et al. | 338/25 |
| 3,760,495 | 9/1973 | Meyer | 29/610 |
| 3,823,217 | 7/1974 | Kampe | 264/105 |
| 3,824,328 | 7/1974 | Ting et al. | 174/52.5 |

(List continued on next page.)

FOREIGN PATENT DOCUMENTS

| 2838508 | 3/1980 | (DE) | H01C/7/02 |
|---|---|---|---|
| 0158410 | 10/1985 | (EP) | H05B/3/10 |
| 0311142 | 4/1989 | (EP) | H01C/1/14 |
| 0611078 | 8/1994 | (EP) | B29B/7/42 |
| 1172718 | 3/1969 | (GB) | H02H/2/08 |
| 1167551 | 10/1969 | (GB) | H05B/3/10 |

(List continued on next page.)

OTHER PUBLICATIONS

Saburi, O. "Proscessing Techniques and Applications of Positive Temperature Coefficient Thermistors", *IEEE Transactions on Component Parts*, pp 53–67(1963).

Meyer, J. "Glass Transition Temperature as a Guide to Selection of Polymers Suitable for PTC Material", *Polymer Engineering And Science*, 13/6:462–468(Nov., 1973).

(List continued on next page.)

*Primary Examiner*—Mark Kopec
(74) *Attorney, Agent, or Firm*—Klein & Szekeres, LLP

(57) ABSTRACT

Positive temperature coefficient polymer (PTC) materials of high loading with uniformly distributed electrically conductive material are manufactured by first producing an intimate mixture (pre-mix or master batch) of a crystalline polymer (e. g. high density polyethylene) with an electrically conductive filler (e. g. carbon black) in proportions that is less rich in the filler than the final PTC product. The intimate mixture, pre-mix or master batch, is utilized in a subsequent step in a molten liquid form for admixing with more filler material in quantities to produce the desired loading of the filler in the polymer matrix. The resulting the admixture is extruded, shaped and formed by conventional equipment to provide a positive temperature coefficient polymer composition that, when equipped with electrodes, is suitable for forming positive temperature coefficient circuit protecting devices. Positive temperature coefficient polymer composition having electrically conductive filler, usually carbon black in ratios as high as 55 to 60 percent by weight can be obtained by the process.

21 Claims, 2 Drawing Sheets

U.S. PATENT DOCUMENTS

| | | | |
|---|---|---|---|
| 3,858,144 | 12/1974 | Bedard et al. | 338/22 R |
| 3,861,029 | 1/1975 | Smith-Johannsen et al. | 29/611 |
| 3,914,363 | 10/1975 | Bedard et al. | 264/105 |
| 3,976,600 | 8/1976 | Meyer | 252/511 |
| 4,101,862 | 7/1978 | Takagi et al. | 338/23 |
| 4,151,126 | 4/1979 | Adelman et al. | 252/508 |
| 4,151,401 | 4/1979 | Van Bokestal et al. | 219/508 |
| 4,177,376 | 12/1979 | Horsma et al. | 219/553 |
| 4,177,446 | 12/1979 | Diaz | 338/212 |
| 4,237,441 | 12/1980 | von Konynenberg et al. | 338/22 R |
| 4,238,812 | 12/1980 | Middleman et al. | 361/106 |
| 4,246,468 | 1/1981 | Horsma | 219/553 |
| 4,250,398 | 2/1981 | Ellis et al. | 219/345 |
| 4,255,698 | 3/1981 | Simon | 320/35 |
| 4,272,471 | 6/1981 | Walker | 264/104 |
| 4,313,996 | 2/1982 | Newman et al. | 428/215 |
| 4,314,230 | 2/1982 | Cardinal et al. | 338/314 |
| 4,314,231 | 2/1982 | Walty | 338/328 |
| 4,315,237 | 2/1982 | Middleman et al. | 338/22 R |
| 4,317,027 | 2/1982 | Middleman et al. | 219/553 |
| 4,327,351 | 4/1982 | Walker | 338/22 R |
| 4,329,726 | 5/1982 | Middleman et al. | 361/58 |
| 4,341,949 | 7/1982 | Steiner et al. | 219/553 |
| 4,348,584 | 9/1982 | Gale et al. | 219/514 |
| 4,352,083 | 9/1982 | Middleman et al. | 338/23 |
| 4,388,607 | 6/1983 | Toy et al. | 338/22 |
| 4,413,301 | 11/1983 | Middleman et al. | 361/106 |
| 4,426,339 | 1/1984 | Kamath et al. | 264/22 |
| 4,426,633 | 1/1984 | Taylor | 338/25 |
| 4,439,918 | 4/1984 | Carroll, II et al. | 29/840 |
| 4,444,708 | 4/1984 | Gale et al. | 264/105 |
| 4,445,026 | 4/1984 | Walker | 219/553 |
| 4,475,138 | 10/1984 | Middleman et al. | 361/58 |
| 4,481,498 | 11/1984 | McTavish et al. | 338/20 |
| 4,490,218 | 12/1984 | Kadija et al. | 204/13 |
| 4,521,265 | 6/1985 | Kunihiko et al. | 156/229 |
| 4,534,889 | 8/1985 | van Konynenburg et al. | 252/511 |
| 4,542,365 | 9/1985 | McTavish et al. | 338/20 |
| 4,545,926 | 10/1985 | Fouts, Jr. et al. | 252/511 |
| 4,548,740 * | 10/1985 | von Tomkewitsch et al. | 252/511 |
| 4,560,498 | 12/1985 | Horsma et al. | 252/511 |
| 4,639,818 | 1/1987 | Cherian | 361/106 |
| 4,647,894 | 3/1987 | Ratell | 338/22 R |
| 4,647,896 | 3/1987 | Ratell | 338/22 R |
| 4,652,325 | 3/1987 | Benge | 156/244.11 |
| 4,654,511 | 3/1987 | Horsma et al. | 219/548 |
| 4,685,025 | 8/1987 | Carlomagno | 361/106 |
| 4,689,475 | 8/1987 | Kleiner et al. | 219/553 |
| 4,698,614 | 10/1987 | Welch et al. | 338/22 R |
| 4,732,701 | 3/1988 | Nishii et al. | 252/511 |
| 4,752,762 | 6/1988 | Inano et al. | 338/22 R |
| 4,755,246 | 7/1988 | Monia | 156/244.11 |
| 4,769,901 | 9/1988 | Nagahori | 29/621 |
| 4,774,024 | 9/1988 | Deep et al. | 252/511 |
| 4,787,135 | 11/1988 | Nagahori | 29/612 |
| 4,800,253 | 1/1989 | Kleiner et al. | 219/553 |
| 4,845,838 | 7/1989 | Jacobs et al. | 29/671 |
| 4,849,133 | 7/1989 | Yoshida et al. | 252/511 |
| 4,876,439 | 10/1989 | Nagahori | 219/541 |
| 4,882,466 | 11/1989 | Friel | 219/219 |
| 4,884,163 | 11/1989 | Deep et al. | 361/58 |
| 4,904,850 | 2/1990 | Claypool et al. | 219/548 |
| 4,907,340 | 3/1990 | Fang et al. | 29/610 |
| 4,924,074 | 5/1990 | Fang et al. | 219/548 |
| 4,942,286 | 7/1990 | Monter et al. | 219/219 |
| 4,951,382 | 8/1990 | Jacobs et al. | 29/611 |
| 4,951,384 | 8/1990 | Jacobs et al. | 29/611 |
| 4,954,696 | 9/1990 | Ishil et al. | 219/548 |
| 4,955,267 | 9/1990 | Jacobs et al. | 29/611 |
| 4,959,505 | 9/1990 | Ott | 174/52.2 |
| 4,967,176 | 10/1990 | Horsma et al. | 338/22 R |
| 4,980,541 | 12/1990 | Shafe et al. | 219/548 |
| 4,983,944 | 1/1991 | Uchida et al. | 338/22 R |
| 5,015,824 | 5/1991 | Monter et al. | 219/219 |
| 5,039,844 | 8/1991 | Nagahori | 219/541 |
| 5,049,850 | 9/1991 | Evans | 338/22 R |
| 5,057,674 | 10/1991 | Smith-Johannsen | 219/553 |
| 5,064,997 | 11/1991 | Fang et al. | 219/505 |
| 5,089,688 | 2/1992 | Fang et al. | 219/505 |
| 5,089,801 | 2/1992 | Chan et al. | 338/22 R |
| 5,140,297 | 8/1992 | Jacobs et al. | 338/22 R |
| 5,142,267 | 8/1992 | Fellner | 338/23 |
| 5,148,005 | 9/1992 | Fang et al. | 219/505 |
| 5,164,133 | 11/1992 | Ishida et al. | 264/105 |
| 5,166,658 | 11/1992 | Fang et al. | 338/23 |
| 5,171,774 | 12/1992 | Ueno et al. | 524/495 |
| 5,173,362 | 12/1992 | Tekkanat et al. | 428/283 |
| 5,174,924 | 12/1992 | Yamada et al. | 252/511 |
| 5,178,797 | 1/1993 | Evans | 252/508 |
| 5,181,006 | 1/1993 | Shafe et al. | 338/22 R |
| 5,190,697 | 3/1993 | Ohkita et al. | 252/511 |
| 5,195,013 | 3/1993 | Jacobs et al. | 361/106 |
| 5,210,517 | 5/1993 | Abe | 338/22 R |
| 5,212,466 | 5/1993 | Yamada et al. | 338/22 R |
| 5,227,946 | 7/1993 | Jacobs et al. | 361/106 |
| 5,241,741 | 9/1993 | Sugaya | 29/612 |
| 5,247,277 | 9/1993 | Fang et al. | 338/22 R |
| 5,250,228 | 10/1993 | Baigrie et al. | 252/511 |
| 5,280,263 | 1/1994 | Sugaya | 338/22 R |
| 5,303,115 | 4/1994 | Nayar et al. | 361/106 |
| 5,358,793 | 10/1994 | Hanada et al. | 428/560 |
| 5,401,154 | 3/1995 | Sargent | 425/114 |

FOREIGN PATENT DOCUMENTS

| | | | |
|---|---|---|---|
| 1458720 | 12/1976 | (GB) | H01C/1/02 |
| 1561355 | 2/1980 | (GB) | C08J/3/24 |
| 1604735 | 12/1981 | (GB) . | |
| 49-82736 | 8/1974 | (JP) | C08K/3/04 |
| 62-240526 | 10/1987 | (JP) | 156/244 |
| 64-47534 | 2/1989 | (JP) | 156/244 |
| 97/06660 | 2/1997 | (WO) . | |
| 97/39461 | 10/1997 | (WO) | H01C/7/02 |

OTHER PUBLICATIONS

Meyer, J. (1974) "Stability of polymer composites as positive–temperature–coefficient resistors" *Polymer Engineering and Science*, 14/10:706–716.

Arrowsmith, D. J. (1970) "Adhesion of Electroformed Copper and Nickel to Plastic Laminates", *Transactions of the Instituted of Metal Finishing*, vol. 48, pp. 88–92.

* cited by examiner

TWO-STEP PROCESS FOR PREPARING POSITIVE TEMPERATURE COEFFICIENT POLYMER MATERIALS

CROSS-REFERENCE TO RELATED APPLICATION

This application claims the benefit, under 35 U.S.C. Section 119(e), of Provisional Application Ser. No. 60/101,892; filed Sep. 25,1998.

BACKGROUND OF THE INVENTION

1. Field of the Invention

The present invention relates to manufacturing methods for preparing positive temperature coefficient polymer compositions. More particularly, the present invention relates to a manufacturing method for preparing positive temperature coefficient polymer compositions of high loading and uniform distribution of filler.

2. Brief Description of the Prior Art

Positive temperature coefficient (PTC) polymer compositions or materials are well known in the art, and have found wide-spread use as PTC devices in numerous electrical and electronic apparatus. The primary function of the PTC devices incorporating these polymer compositions is to prevent overloading and/or overheating of an electronic circuit. PTC devices are capable of serving this function because of the characteristic of the PTC polymer compositions to abruptly increase their electrical (ohmic) resistance with a relatively small rise in temperature within a predetermined (tripping) temperature range. Thus the PTC devices act as a type of fuse that trips when the circuit in which it is incorporated in series draws more than a predetermined amperage, and allow normal operation again after the cause for increased amperage in the circuit has ceased to exist and the heat generated in the PTC device by the excess current is dissipated.

The positive temperature coefficient polymers incorporated in the PTC devices typically comprise a crystalline polymer matrix in which an electrically conductive material (filler) is uniformly distributed. A typical and frequently used polymer for the matrix is high density polyethylene (HDPE), and a typical and frequently used electrically conductive material for the filler is carbon black. The PTC polymer materials typically include a high loading of the filler, for example a typical composition may contain approximately 45 percent by weight of carbon black.

A detailed description of the principles of operation of PTC devices, materials and methods of manufacturing the same, can be found in published PCT application WO 97/06660 (published on Feb. 27, 1997) assigned to the same assignee as the present application, and in published PCT application WO 97/39461 (published on Oct. 23, 1997).

Several problems encountered in the prior art in connection with the manufacturing of the PTC polymers relate to or are caused by the high loading of the polymer matrix with the carbon black or other filler. Briefly summarized, the high loading renders it difficult to consistently achieve uniform distribution of the filler, and therefore difficult to achieve uniform resistivity. The high loading also results in relatively high wear and tear of the machinery utilized for manufacturing the PTC polymer material, causes frequent jamming and difficult clean-up after jamming of the machinery.

The present invention provides an improved process for manufacturing the PTC polymeric materials. The manufacturing process of the present invention results in more consistently uniform distribution of the filler in the polymer matrix, reduces wear and tear in the machinery, eases the task of cleaning-up the machinery, and allows for manufacturing PTC materials with higher loading of conductive filler than was consistently possible in the prior art.

SUMMARY OF THE INVENTION

Positive temperature coefficient polymer materials are manufactured in accordance with the present invention by first producing an intimate mixture (pre-mix or master batch) of a crystalline polymer, such as high density polyethylene, with an electrically conductive filler, such as carbon black, in proportions that is less rich in the filler than the final PTC product. The intimate mixture, pre-mix or master batch, is utilized in a subsequent step in a molten liquid form for admixing with more filler material in quantities to produce the desired loading of the filler in the polymer matrix. Thereafter, the admixture is extruded, shaped and formed by conventional equipment to provide a positive temperature coefficient polymer composition that, when equipped with electrodes, is suitable for forming positive temperature coefficient circuit protecting devices.

Advantages of the two-step admixing process of the present invention include the ability to provide uniform distribution of the filler in the polymer matrix, reduced wear and tear in the machinery that performs the second admixing with the filler and extrusion, and ability to attain a higher percentage of loading with the filler than what was normally achievable in the prior art.

DESCRIPTION OF THE PREFERRED EMBODIMENT

Figure 1:
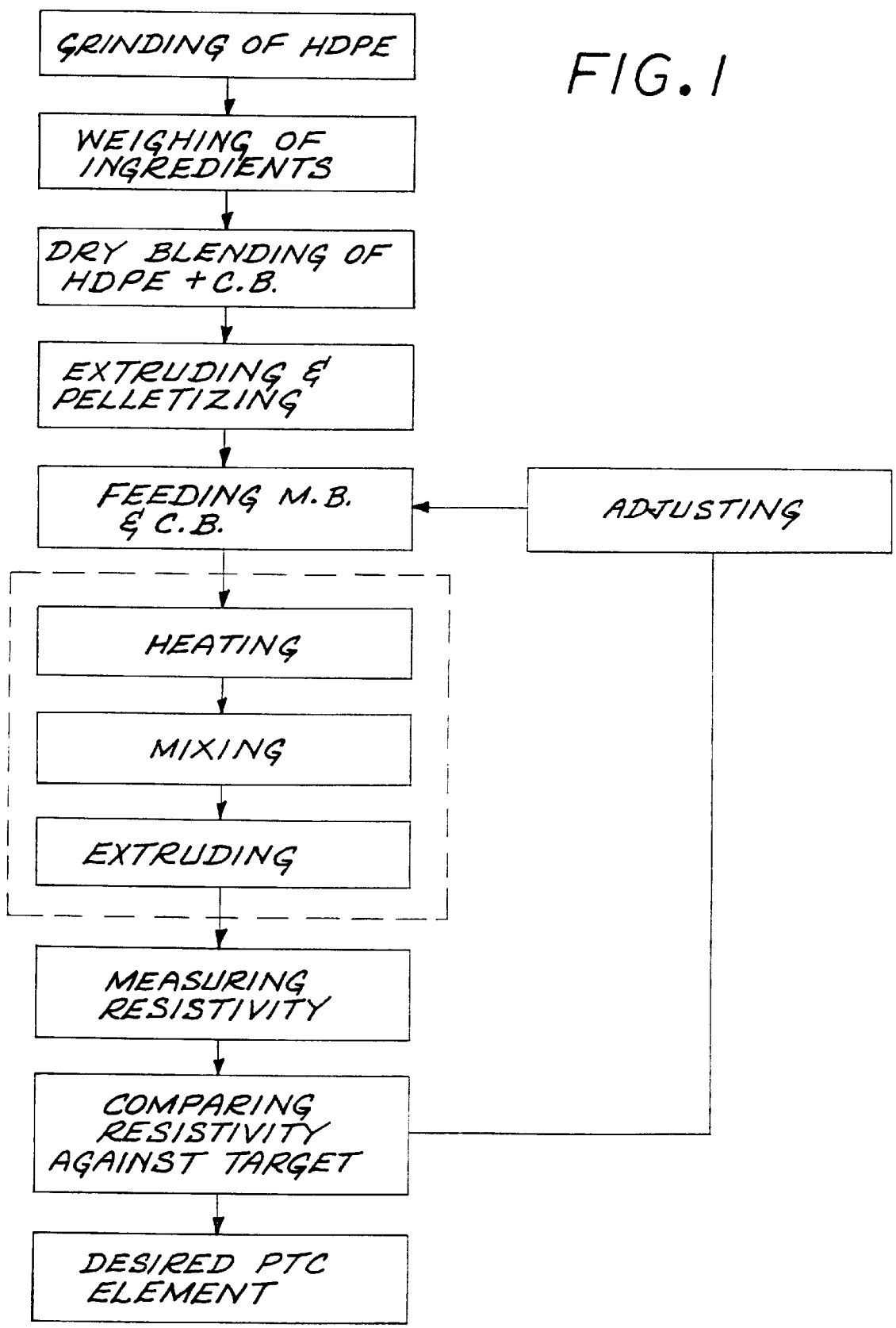
FIG. 1 is a flow-chart showing the steps performed in the preferred embodiment of the manufacturing process of the present invention.

A number of polymers, copolymers and mixtures of polymers are known in the art as suitable for the manufacture of positive temperature coefficient (PTC) compositions, and are described for example in the publications WO 97/39461 (see pages 17–18) and WO/970660 (see page 14). Although in the preferred embodiment of the process of the present invention high density polyethylene (HDPE) is used, the process of the present invention is applicable for the manufacture of positive temperature coefficient (PTC) compositions with any one of the polymers, copolymers or polymer mixtures which are otherwise known in the art to be suitable for this purpose. Another example for a preferred polymeric material used in the process of the present invention is polyvinylidene fluoride (PVDF). The descriptive portions and drawings of the publications WO 97/39461 and WO/970660 are expressly incorporated herein by reference.

Conductive filler components suitable for the manufacture of positive temperature coefficient (PTC) compositions are also well known in the art, and are also described in the publications WO 97/39461 (see page 18) and WO/970660. Generally speaking, the art prefers the use of carbon black (C.B.) as the filler material, and carbon black is also the preferred electrically conductive filler used in the process of the present invention.

Generally speaking, the objective of the present invention is to attain a consistently uniform (and preferably also high) loading of the filler (carbon black) in the polymer (preferably HDPE) matrix, with minimum wear-and-tear on the machinery that manufactures the positive temperature coefficient (PTC) compositions. The process of the invention that accomplishes these objectives is hereinafter described with reference to the drawing figures and in connection with the use of high density polyethylene (HDPE) and carbon black. Nevertheless, it should be kept in mind that other polymers and fillers known in the art, as noted above, can also be used in accordance with the present invention. The process of the invention is capable of producing positive temperature coefficient (PTC) compositions with a loading of carbon black (or other filler) as high as approximately 55 to 60 percent by weight, a more typical and presently preferable loading in accordance with the process is 50 to 55 percent by weight.

FIG. 1 schematically shows the step wherein the HDPE material is ground to provide particles typically in the range of 0.05 to 0.5 mm, preferably in the range of 0.1 to 0.2 mm. The grinding of the HDPE material can be performed by conventional techniques, utilizing conventional machinery suitable for this purpose. In the presently preferred embodiment of the invention the grinding of the polymer particles is performed in a conventional pellet grinder.

In the next step of performing the process of the invention, desired quantities of the ground HDPE and carbon black are measured by weight and admixed, so as to provide an admixture of predetermined desired proportions of HDPE and carbon black. The carbon black utilized for this purpose is commercially available. Typically, carbon black utilized for the manufacture of PTC compositions has a particle size of 20 to 100 nm, the carbon black presently utilized in the preferred embodiment of the process of the invention is in the particle size range of 50 to 100 nm. The weighing of the two components, HDPE and carbon black and their mixing or blending can be performed batch-wise, or in a continuous process. The mixing or blending step is indicated in FIG. 1 as "dry blending", signifying that the first mixing of these components is at ambient temperature, without melting of the polymer material. When the weighing and blending is performed in a continuous process, then the components may be fed into a mixing apparatus (not shown) by feeder hoppers, (not shown) conventional in the art.

The "dry blended" admixture of HDPE and carbon black is thereafter extruded and pelletized, to provide a "pre-mix" or "master batch" (M.B.) of intimately admixed HDPE and carbon black material. The extrusion and pelletizing of this pre-mix or master batch (M.B.) can be performed in machinery which per se is conventional in the art. Presently, the steps of extrusion and pelletizing of this pre-mix are preferably performed in a co-rotation twin screw compounding extruder having a diameter of 46 mm, and a length to diameter (L/D) ratio of approximately 40. The pelletizing machinery is preferably equipped with double vent ports and a water bath is preferably employed in the pelletizing step.

Generally speaking, the pre-mix or master batch of HDPE and carbon black contains approximately 25 to 45 percent (by weight) of carbon black; presently it is preferred to produce a pre-mix or master batch that has approximately 30 to 35 percent by weight of carbon black.

The pre-mix or master batch admixture of HDPE and carbon black may be stored for substantial time periods without absorbing moisture, and is therefore better suited for storage than carbon black which is hygroscopic and absorbs moisture. Absorbed moisture is known to adversely affect the electrical characteristics of the PTC devices containing carbon black. Because the pre-mix or master batch admixture of HDPE and carbon black can be stored for substantial time, it can be manufactured well in advance before it is utilized in the subsequent steps of the process of the present invention, and can be manufactured at location different than where the subsequent steps are performed. The precise composition of the pre-mix or master batch can be deduced from the quantities of materials added and can also be analyzed by conventional methods.

Figure 2:
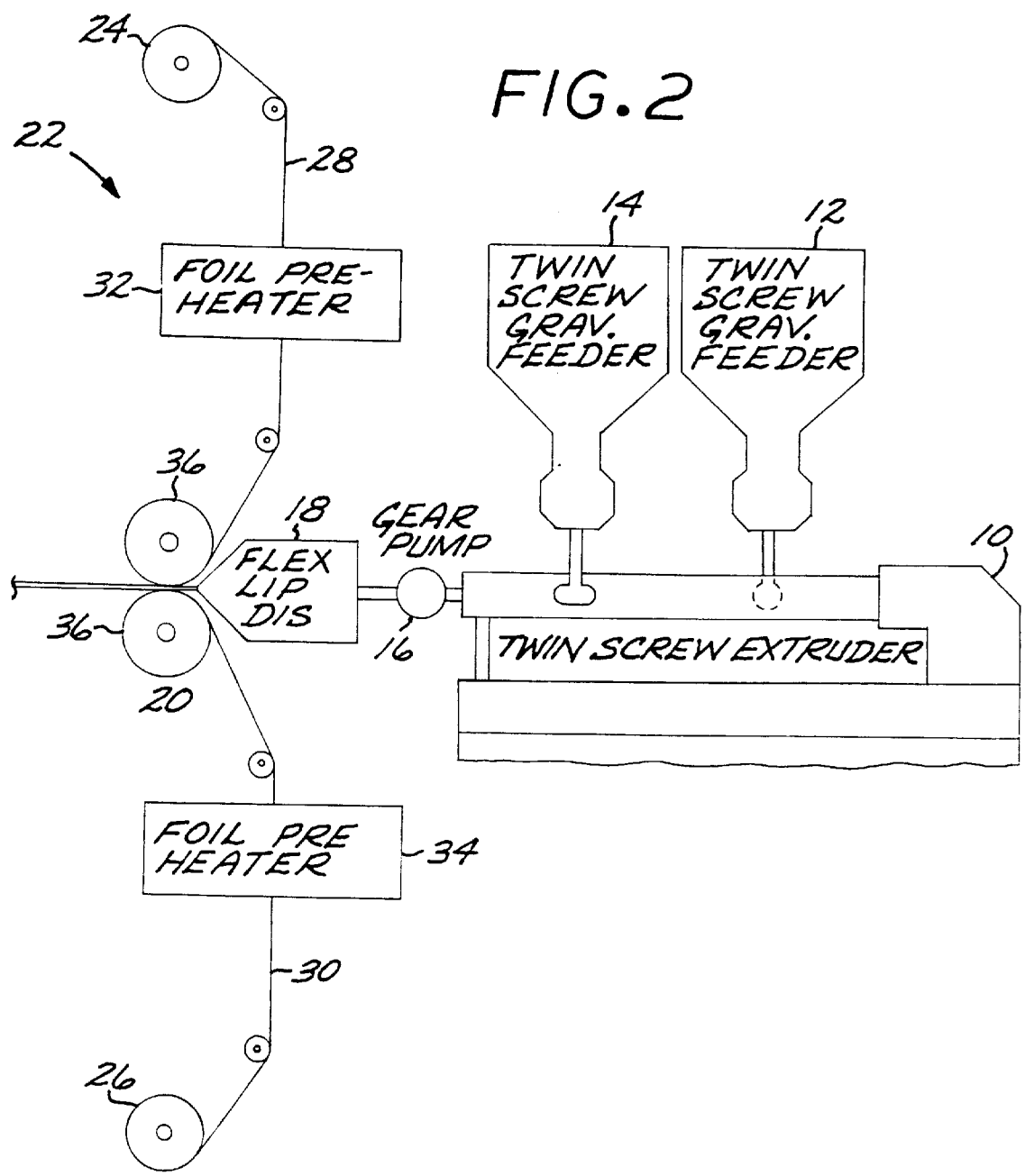
FIG. 2 is a schematic representation of the preferred mode of performing a second admixing and extrusion step in accordance with the present invention.

In the next step of the process of the invention, as is schematically shown in the drawing figures, the pre-mix or master batch is fed into a compounding extruder 10 through its main feed hopper which in this example is a single screw gravitational feeder 12, as shown in the more detailed schematic drawing of FIG. 2. Carbon black, in the amount calculated to provide the desired carbon black loading in the PTC composition, is also fed into the compounding extruder 10 through another feeder hopper that is shown in the drawing as twin screw gravitational feeder 14. The compounding extruder 10 provides heat to melt the HDPE material, and applies its twin screws to admix the master batch with the newly added carbon black, and to supply the admixture through a gear pump 16 into a die 18. The quantity of carbon black added to the compounding extruder in this step of the process raises the loading of the resulting mixture to the typical approximately 50 to 55 percent by weight, and if desired may raise it to approximately 55 to 60 percent by weight. The compounding extruder 10 used in this step may apply its twin screws in co-rotation, or counter-rotation, presently however the use of counter-rotating screws is preferred.

Figure 3:
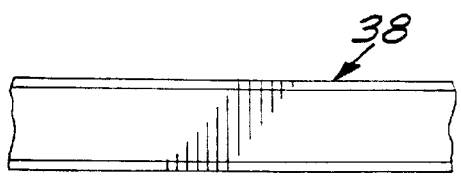
FIG. 3 is a side view of a laminated positive temperature coefficient composition produced in the process of the invention.

Whereas the material, pre-mix or master batch, utilized in the compounding extruder 10 is new and gives rise to new and beneficial results in the process, the compounding extruder 10 and the rest of the apparatus shown in FIG. 2 per se is known in art. Preferably it is constructed in accordance with the teachings of published PCT application WO 97/0660. Briefly summarizing the conventional or prior art part of the apparatus shown in FIG. 2, the gear pump 16 produces a substantially constant volumetric output of the compounded "melt phase" material at sufficiently high pressure for delivery into the sheet die 18. The sheet die 18 forms the compounded material, while still in the melt phase, into a high tolerance continuous web 20. The formed polymeric web 20, while at a temperature just below the melt temperature of the polymeric material, is fed into a lamination mechanism 22. The lamination mechanism 22 receives from first and second pay-off reels 24 and 26 first and second continuous webs or sheets 28 and 30 of conductive metal foil. These foil sheets 28 and 30 are passed through first and second foil pre-heaters 32 and 34, and the foils are laminated between a pair of lamination rollers 36 onto each side of the polymeric web 20. The resulting continuous web of laminate 38 may then be cut into measured lengths, prior to forming individual active PTC elements (not shown). The conductive foils 28 and 30 on each side of the laminate 38 act as electrodes in the active PTC elements. The cutting of the laminate 38 and the formation of individual active PTC device elements is not shown in FIG. 2. The laminate 38 itself is schematically shown in FIG. 3.

Several means for controlling the quality and characteristics of the PTC composition, and that of the resulting laminate 38 may be utilized as part of, or in conjunction with the present invention. For example, as is described in published PCT application WO 97/0660, a closed loop feedback control system, under the control of a microprocessor (not shown) may be used to control the feeders 12 and 14, as well as the pressure applied in the compounding extruder 10.

The microprocessor may use an algorithm that uses the inlet pressure of the gear pump 16 as the controlling parameter, with a predetermined inlet pressure as the set point. Thus, by means of a pressure transducer (not shown) at the inlet of the gear pump 16 the pump inlet pressure is measured, and a measured pressure signal is fed to the microprocessor. The microprocessor then periodically compares the value of the measured pressure signal with the stored nominal or set point pressure value. The comparison yields a pressure difference signal that is fed to a feeder control mechanism (not shown) and an extruder control mechanism (not shown) respectively, to synchronize the feed rates of the gravimetric feeders 12, 14, and the rotation rate of the screws in the twin screw extruder 10 in such a manner as to minimize the absolute value of the pressure difference signal. Since the pump inlet pressure is a function of the feed rates and extruder screw rotation rate, the pump inlet pressure can be maintained at or very close to the set point pressure by controlling the feed rates and the extruder screw rotation rate.

If a thickness gauge (not shown) is used to measure the thickness of the laminate 38 then another closed loop feedback system may be employed to maintain the thickness of the laminated web 38 to within close tolerances. The thickness control system employs a measured thickness signal generated by the thickness gauge and fed to the microprocessor that may control the thickness of the laminate 38 in analogy to the control mechanism described above, and specifically as disclosed in published PCT application WO 97/0660.

Still another important control mechanism that is used in the process of the present invention is illustrated in the flow chart drawing of FIG. 1. In accordance with this control mechanism the resistivity of the PTC composition produced in the process is measured, and the measured value is compared to a predetermined desired resistivity value. The amount of carbon black and/or the amount of pre-mix or master batch material is then adjusted in the feeders 12 and 14 to obtain a laminate 38 having a corrected or upgraded resistivity. The steps of measuring resistivity, comparing the measured values to a predetermined desired resistivity value, and adjusting the feeding mechanism in accordance with the difference, can be performed periodically, or continuously and automatically by using a microprocessor (not shown) The microprocessor receives as its input a signal representing the measured resistivity, compares it to the stored predetermined desired resistivity value, and produces a difference signal that is used in an algorithm to produce signals for controlling the feeders 12 and 14. The principles of controlling the feeder in a feedback system using the measured resistivity of the PTC product, are described in published PCT application WO 97/39461.

Several advantages of the above-described novel process of the invention include the ability to prepare and store the master batch HDPE-carbon black mixture without the disadvantage caused by the hygroscopic properties of carbon black. Another advantage of the invention is the ability to consistently attain uniform distribution of the filler material in the polymer matrix and therefore attain uniform resistivity and other physical characteristics in the PTC composition.

Still another advantage is that relatively high torques are avoided during operation of the compounding extruder, whereas high torques frequently occur in the prior art when a PTC composition having a high loading of carbon black is prepared. As the high torques approach the design limit in the extruders in accordance with the prior art, the mixing process is less stable and results in material inconsistency and poor yield of the product. The high torques in the prior art also result in extensive wear of the extruder machinery. High loading with carbon black in the prior art also leads frequently to stiff carbon black aggregates that jam the machinery, resulting in difficult and expensive interruption in the operation of the machinery and tedious clean-up. All of the foregoing is avoided in accordance with the present invention. Yet another advantage of the present invention is the ability to produce PTC compositions of such high carbon black loading (approximately 55 to 60 percent by weight) with consistently uniform electrical characteristics that was hitherto very difficult or impossible in accordance with the prior art.

What is claimed is:

1. A process for producing a positive temperature coefficient polymer composition comprising a crystalline polymer and an electrically conductive filler that is present in a predetermined proportion in the composition, the process comprising the steps of:

blending the crystalline polymer with the electrically conductive filler into a first intimate admixture in proportions wherein the electrically conductive filler is less in the first intimate admixture than the predetermined proportion in the positive temperature coefficient polymer composition;

extruding said first admixture to obtain an extruded pre-mix of crystalline polymer and filler;

allowing the first admixture to solidify, and thereafter admixing the pre-mix with more electrically conductive filler in sufficient quantity to attain the predetermined proportion of filler in the composition, and melting and extruding the resulting mix to form said positive temperature coefficient polymer composition.

2. The process of claim 1 where the crystalline polymer is high density polyethylene and the electrically conductive filler is carbon black.

3. The process of claim 2 where the pre-mix comprises approximately 25 to 45 percent by weight of carbon black.

4. The process of claim 2 where the positive temperature coefficient polymer composition comprises approximately 50 to 60 percent by weight of carbon black.

5. The process of claim 1 where the step of blending the crystalline polymer with the electrically conductive filler into a first intimate admixture is performed at room temperature.

6. The process of claim 5 where the electrically conductive filler is carbon black having a particle size of approximately 20 to 100 nm.

7. The process of claim 6 wherein approximately 25 to 45 percent by weight of carbon black is blended with the crystalline polymer.

8. The process of claim 7 where the crystalline polymer is high density polyethylene.

9. The process of claim 1 where the step of admixing the pre-mix with more electrically conductive filler is performed in a compounding extruder.

10. The process of claim 9 where the pre-mix comprises approximately 25 to 45 percent by weight of carbon black and where sufficient carbon black is added to said pre-mix to raise the carbon black content of the positive temperature coefficient composition to approximately 50 to 60 percent by weight.

11. The process of claim 10 where the crystalline polymer is high density polyethylene.

12. The process of claim 1 further comprising the steps of measuring the electrical resistivity of the positive temperature coefficient polymer composition that is obtained in the process and generating a signal that is proportional to the difference between the measured resistivity and a pre-set resistivity value, and utilizing said difference signal to adjust the quantity of electrically conductive filler added to the pre-mix in the admixing step to minimize the value of said difference signal.

13. The process of claim 12 wherein the steps of measuring the electrical resistivity of the positive temperature coefficient polymer composition, generating a difference signal and utilizing said difference signal to adjust the quantity of electrically conductive filler added to the pre-mix is performed periodically and include the application of a microprocessor.

14. The process of claim 12 wherein the steps of measuring the electrical resistivity of the positive temperature coefficient polymer composition, generating a difference signal and utilizing said difference signal to adjust the quantity of electrically conductive filler added to the pre-mix is performed continuously and include the application of a microprocessor.

15. A process for producing a positive temperature coefficient polymer composition comprising high density polyethylene and electrically conductive carbon black that is present in a predetermined proportion in the composition in the range of approximately 50 to 60 percent by weight, the process comprising the steps of:

blending high density polyethylene with carbon black into a first intimate admixture in proportions wherein the carbon black is substantially less in the first intimate admixture than the predetermined proportion of carbon black in the positive temperature coefficient polymer composition;

extruding said first admixture to obtain an extruded pre-mix of crystalline polymer and carbon black comprising carbon black in the range of approximately 25 to 45 percent by weight;

allowing the first admixture to solidify, and thereafter admixing the pre-mix with more carbon black in sufficient quantity to attain the predetermined proportion of carbon black in the composition, and melting and extruding the resulting mix to form said positive temperature coefficient polymer composition.

16. The process of claim 15 wherein the step of dry blending is performed at substantially ambient temperature.

17. The process of claim 15 wherein the extruded pre-mix comprises carbon black in the range of approximately 30 to 35 percent by weight.

18. The process of claim 17 wherein in the step of admixing the pre-mix sufficient carbon black is added to attain said positive temperature coefficient polymer composition comprising a predetermined percentage of carbon black in the range of approximately 50 to 55 percent by weight.

19. The process of claim 15 further comprising the steps of measuring the electrical resistivity of the positive temperature coefficient polymer composition that is obtained in the process and generating a signal that is proportional to the difference between the measured resistivity and a pre-set resistivity value, and utilizing said difference signal to adjust the quantity of carbon black added to the pre-mix in the admixing step to minimize the value of said difference signal.

20. The process of claim 19 wherein the steps of measuring the electrical resistivity of the positive temperature coefficient polymer composition, generating a difference signal and utilizing said difference signal to adjust the quantity of carbon black added to the pre-mix is performed periodically and include the application of a microprocessor.

21. The process of claim 19 wherein the steps of measuring the electrical resistivity of the positive temperature coefficient polymer composition, generating a difference signal and utilizing said difference signal to adjust the quantity of carbon black added to the pre-mix is performed continuously and include the application of a microprocessor.

* * * * *